Dec. 6, 1949     G. W. SPURLOCK     2,490,486
AUTOMATIC WHEEL LOCK
Filed Nov. 18, 1948     3 Sheets-Sheet 1
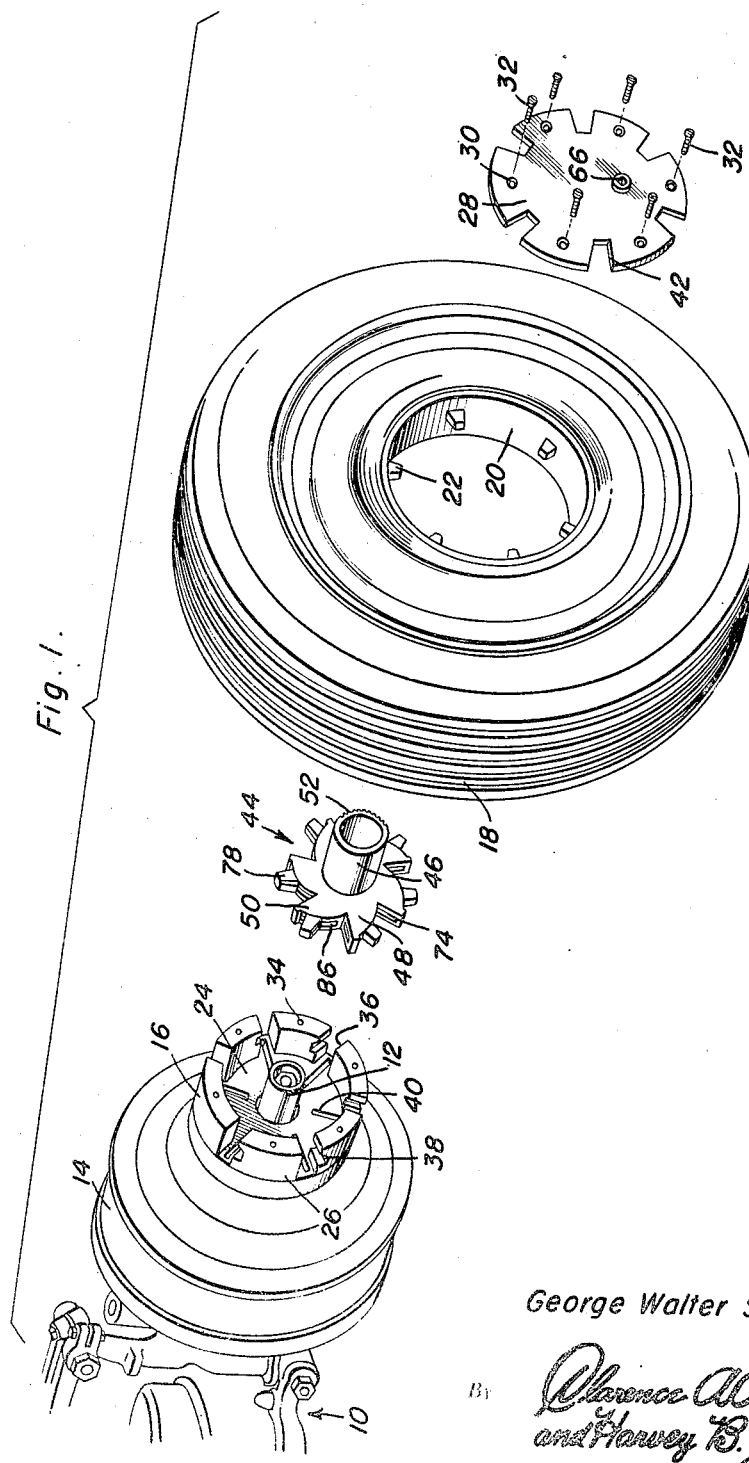
Inventor
George Walter Spurlock
By Clarence A. O'Brien
and Harvey B. Jacobson
Attorneys Dec. 6, 1949     G. W. SPURLOCK     2,490,486
AUTOMATIC WHEEL LOCK
Filed Nov. 18, 1948     3 Sheets-Sheet 2
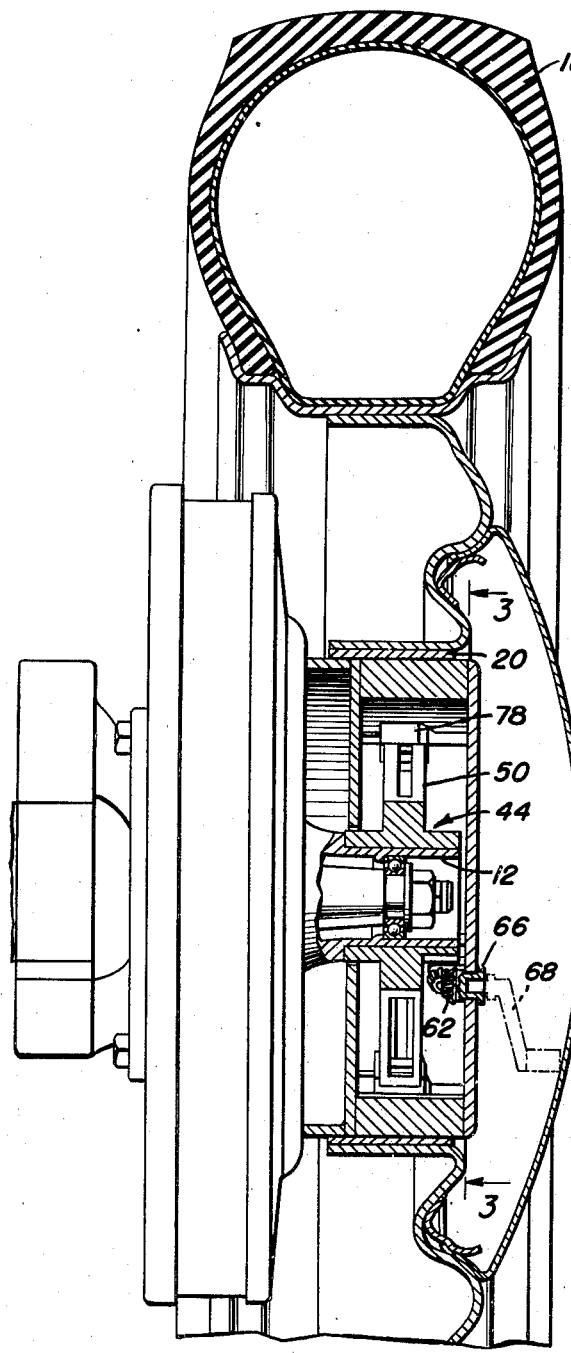
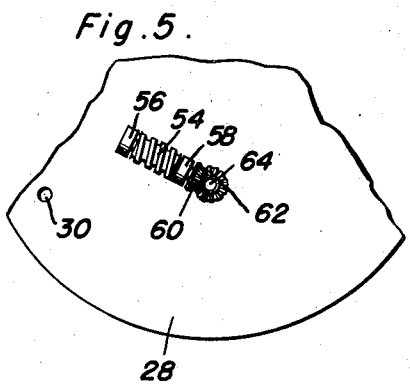
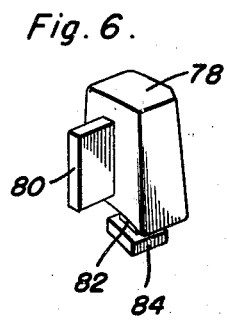
Inventor
George Walter Spurlock
By *Clarence A. O'Brien and Harvey B. Jacobson*
Attorneys Dec. 6, 1949  G. W. SPURLOCK  2,490,486
AUTOMATIC WHEEL LOCK
Filed Nov. 18, 1948  3 Sheets-Sheet 3

Inventor
George Walter Spurlock
By Clarence A. O'Brien
and Harvey B. Jacobson
Attorneys Patented Dec. 6, 1949

2,490,486

UNITED STATES PATENT OFFICE 2,490,486

AUTOMATIC WHEEL LOCK

George Walter Spurlock, Joliet, Ill., assignor of thirty per cent to Richard Cunningham, Chicago, Ill.

Application November 18, 1948, Serial No. 60,788

5 Claims. (Cl. 301—9)

This invention comprises novel and useful improvements in an automatic wheel lock and more specifically pertains to a locking device for retaining tires of demountable wheel constructions upon their supporting hubs.

The principal object of this invention is to provide an improved demountable wheel construction wherein the demountable tire carrying wheel units may be more easily and quickly applied to or removed from the supporting hubs carried by the brake drums of a vehicle.

The principles of the invention may be carried out in various ways, a preferred embodiment being illustrated by way of example only in the accompanying drawings, wherein:

Figure 1 is a perspective group assembly view of the various elements for detachably mounting a wheel upon the hub of a brake drum in accordance with the principles of this invention;

Figure 2 is a vertical sectional view, part being broken away, showing a wheel mounted upon the hub of a brake drum in accordance with the principles of this invention;

Figure 5 is a fragmentary elevational view from the rear of the cover plate of the device, illustrating demounting of the gearing cooperating the wheel locking means; and Figure 6 is a perspective view of one of the locking pins by means of which the wheel unit is detachably secured upon the wheel hub in accordance with this invention.

Figure 3:
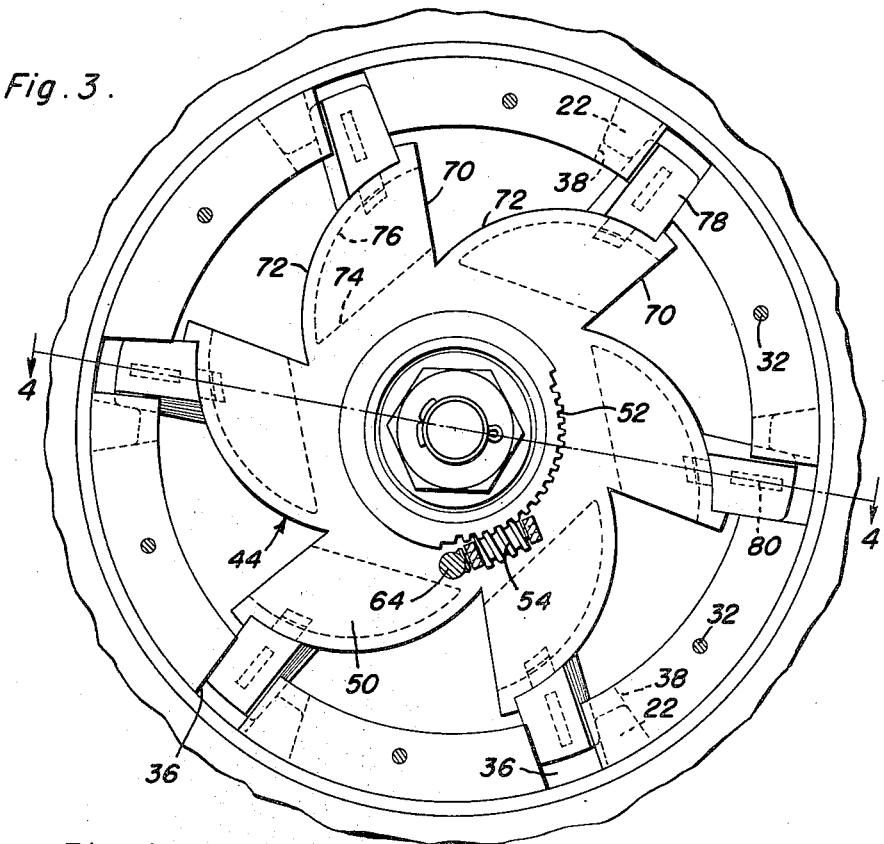
Figure 3 is a view in elevation taken substantially upon the plane of the section line 3—3 of Figure 2, certain concealed parts of the invention being indicated in dotted lines therein.

Referring now more specifically to the accompanying drawings, wherein like numerals designate similar parts throughout the various views, the numeral 10 indicates a portion of an axle assembly of the chassis of an automotive vehicle, and as shown represents a part of the front axle assembly thereof, and which in accordance with customary practice includes a front axle spindle 12 upon which is rotatably mounted a brake drum 14 provided with a hub 16 to which is detachably secured a demountable wheel 18 of any desired construction and which includes a wheel hub or rim 20 which is provided with a plurality of radially inwardly extending locking lugs 22, in accordance with this invention.

It is to be distinctly understood that the principles of the invention and the locking system and mechanism hereinafter described are equally applicable to each of the four wheels of a vehicle; it being understood that preferably although not necessarily, the reverse arrangement from that illustrated will be employed for a wheel upon the other side of the automotive vehicle.

Referring now first to Figure 1 it will be seen that the hub 16 which is rigidly carried by and is rotatable with the brake drum 14, has a bottom wall 24 which is surrounded by a circumferentially extending cylindrical side wall 26, which upon its outer end is detachably provided with a closure plate 28 having apertures 30 for receiving fastening bolts 32 which extend into correspondingly spaced threaded apertures 34 in the outer end of the cylindrical wall 26 for detachably securing said cover plate thereto.

As will be readily apparent from Figure 1, the cylindrical wall 26 is provided with a plurality of appropriately spaced radial notches 36 which extend axially into the cylindrical wall 26, and which at their inner ends are provided with circumferentially extending slots 38, these slots being similar to the well known bayonet type of fastening apertures, and serving a similar purpose.

Adjacent each of the notches 36, the bottom wall 24 is provided with a radial slot 40 which constitutes a guide for a purpose to be later set forth.

The cover plate 28, is likewise provided with a plurality of radially extending notches or apertures 42, which respectively register with the notches 36, so that when the cover plate is secured upon the hub, the inwardly extending lugs 22 of the demountable wheel hub 20 may be moved axially through the aligned apertures 42 and notches 36, until the lugs are seated against the bottom of the notches 36, whereupon the wheel may be given a slight rotation in a counter-clockwise direction as seen in Figure 1, thereby causing the lugs 22 to move circumferentially into the slots 38, whereby the demountable wheel is prevented from disengagement from the hub 16 until the reverse rotational movement again lines up the lugs 22 with the notches 36.

However, when once the lugs 22 have been seated in the ends of the slots 38, locking pins to be now described are projected radially into the notches 36 to prevent the releasing rotational movement of the lugs in the slots 38, and thereby securely and positively lock the demountable wheel unit upon its supporting hub.

The means for locking the hub of the demountable wheel unit upon the hub unit 16 of the brake drum consists of a tumbler unit indicated generally by the numeral 44, which comprises a sleeve member 46 rotatably received upon the spindle 12, and having at one end thereof a rigidly or integrally attached flanged member 48 having a plurality of arcuately shaped, radially extending cam actuating arms 50, there being one such arm for each of the notches 36.

At its other end, the sleeve 46 is provided with external gear teeth 52, in the form of a mutilated or segmental gear, see Figure 3, which are constantly in mesh with a worm gear 54, suitably journaled and supported by lugs 56 and 58 carried by the inward surface of the cover plate 28, see Figure 5. One end of this worm gear is provided with a bevel gear 60 which is in mesh with a similar bevel gear 62, mounted on a stub shaft 64 which extends through the cover plate 28, and is provided with a socketed end 66 into which may be detachably inserted a hand crank 68, see Figure 2, by means of which the bevel gears, the worm gear, the segmental gear and hence the tumbler 44 may be rotated for selectively locking or unlocking the demountable wheel hub upon the brake drum hub.

Figure 4:
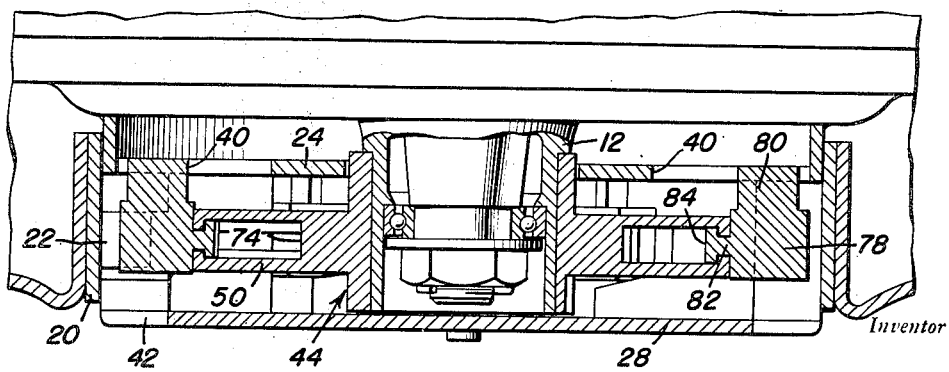
Figure 4 is a sectional view taken substantially upon the plane of the section line 4—4 of Figure 3.

Each of the radial arms 50 is provided with a substantially radially extending face 70, see Figure 3, and with a curved cam face 72 which intersects the same. Opening from the face 70 into the radial arms 50 are chambers 74, having curved upper walls 76, as indicated by dotted lines in Figure 3 and as shown in Figures 2 and 4.

The surfaces 72 and 76 are concentric and equidistantly spaced from each other to provide inner and outer cam surfaces for advancing and retracting locking pins to be set forth hereinafter.

These locking pins, as shown in Figures 1, 3 and 6, comprise wedge-shaped bodies 78, having laterally extending guide ribs 80 which are receivable and are radially slidable in the guide slots 40 in the bottom wall 24 of the hub, and are further provided with neck portions 82 having followers 84 extending laterally from the lower ends thereof. The neck portions 82 are adapted to slide in the arcuate slots 86 of the outer cam surfaces 72, while the plates 84 are movable against the under surface 76. Thus, the locking pins are slidable along the arcuate cam surfaces 72 and 76, the former positively urging the locking pin radially outward from the assembly by means of the radial guide slots 40, while the surface 76 positively retracts the same, upon reverse rotation of the tumbler 44.

The arrangement is such that after the lugs 22 have been received in the notches 36 and the wheel unit rotated in a counter-clockwise direction as viewed in Figure 1 to cause the lugs to seat in the rear ends of the slots 38, the tumbler may be rotated in a counter-clockwise direction, whereby the cam surfaces 72 positively urge the locking pins 78 into the notches 36, whereby the tapering surfaces of the locking pins are wedged between the locking lugs 22 and the other end of the slots 36 to thereby firmly hold the lugs in the slots and prevent their registration with the notches by means of which they might be withdrawn. Obviously, to unlock the wheel unit, it is merely necessary to rotate the tumbler in a clockwise direction, whereupon the cam surface 76 positively retracts the locking pins, and thereby permits the wheel unit to be rotated in a clockwise direction to again cause the lugs 22 to register with the notches 36 whereupon axial movement of the wheel unit will readily permit the latter to be withdrawn.

As shown in Figure 2, a hub cap 88 of any conventional design may be associated with the demountable rim of the wheel unit 18 in accordance with conventional practice.

It should be here noted that a wheel unit may be easily applied to or removed from a hub unit without the necessity of removing a cover plate 28 by reason of the registry of the apertures 42 with the notches 36, and by merely removing the hub cap 88 whereby the hand crank 68 may be engaged with the socketed end 66 of the stub shaft 64 for causing rotation of the same to selectively lock or unlock the demountable wheel unit.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In a demountable wheel construction, a wheel receiving hub having a bottom wall and a cylindrical wall extending therefrom, said cylindrical wall having lock sockets therein for receiving inwardly projecting locking lugs of a wheel, a tumbler rotatable in said hub, locking pins carried by said tumbler movable into said lock sockets for preventing withdrawal of said locking lugs therefrom, gear teeth on said tumbler, a closure plate for said hub and gearing mounted on the inside of said closure plate and operable from the outside thereof for engagement with said gear teeth.

2. In a demountable wheel construction, a wheel receiving hub having a bottom wall and a cylindrical wall extending therefrom, said cylindrical wall having lock sockets therein for receiving inwardly projecting locking lugs of a wheel, a tumbler rotatable in said hub, locking pins carried by said tumbler movable into said lock sockets for preventing withdrawal of said locking lugs therefrom, said lock sockets comprising radial notches extending axially into said cylindrical wall, the bottom of said notches having circumferential slots, said lugs being movable axially into said notches and circumferentially into said slots.

3. The combination of claim 2 wherein said locking pins are movable radially of said tumbler for reception in said notches.

4. The combination of claim 3 wherein said locking pins are wedge shaped for locking said projections against rotary movement from said slots.

5. In a demountable wheel construction, a wheel receiving hub having a bottom wall and a cylindrical wall extending therefrom, said cylindrical wall having lock sockets therein for receiving inwardly projecting locking lugs of a wheel, a tumbler rotatable in said hub, locking pins carried by said tumbler movable into said lock sockets for preventing withdrawal of said locking lugs therefrom, a closure plate secured to said hub, said plate having radial slots registering with said notches.

GEORGE WALTER SPURLOCK.

REFERENCES CITED

The following references are of record in the file of this patent:

UNITED STATES PATENTS

| Number | Name | Date |
| --- | --- | --- |
| 2,043,123 | Slick | June 2, 1936 |